Sept. 30, 1958 N. C. BREMER ET AL 2,853,861
FLEXIBLE COUPLING
Filed Jan. 31, 1957
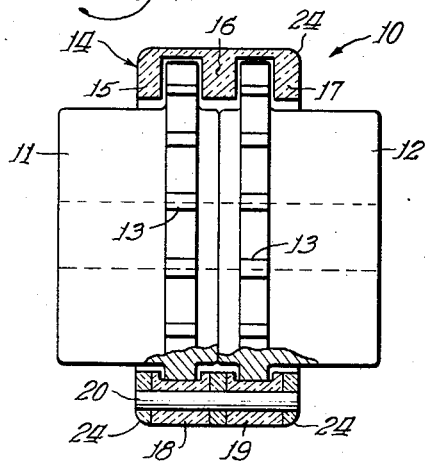
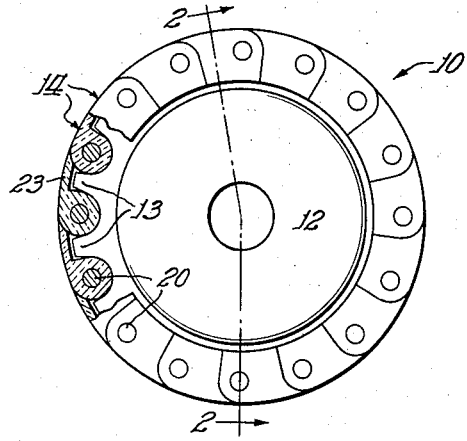
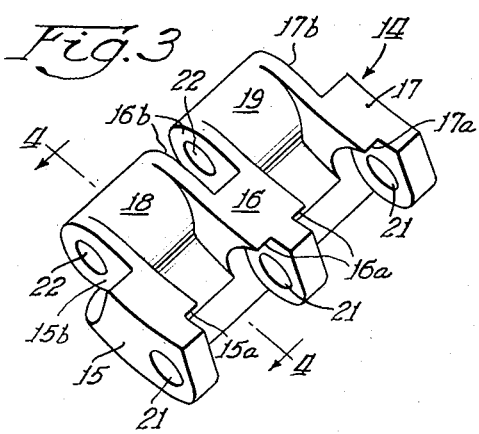
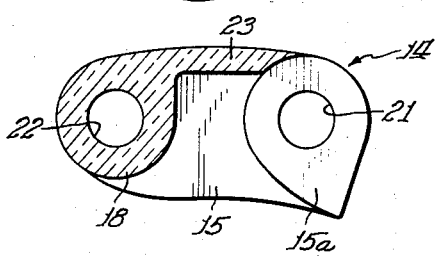
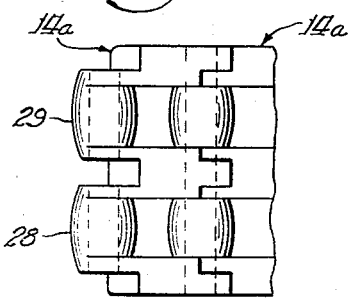
Inventors:
Norman C. Bremer
and Charles M. Allaben, Jr.
By: Frank C. Parker
Atty

United States Patent Office 2,853,861
Patented Sept. 30, 1958

2,853,861
FLEXIBLE COUPLING

Norman C. Bremer and Charles M. Allaben, Jr., Ithaca, N. Y., assignors to Morse Chain Company, a corporation of New York Application January 31, 1957, Serial No. 637,407

6 Claims. (Cl. 64—19)

The present invention relates to coupling devices and is particularly concerned with that class of couplings for interconnecting a pair of substantially axially abutting sprocket elements disposed respectively on generally axially aligned torque transmitting shafts.

It is an object of the present invention to provide an improved flexible coupling of the type comprising a continuous chain having links respectively adapted to be disposed in meshing engagement with the teeth of the abutting sprockets.

A more particular object of the present invention is to provide an improved plastic coupling device constituting plastic links adapted to be formed into a continuous length so as to interconnect for torque transmitting relationship a pair of abutting sprocket elements.

A further object of the present invention is to provide a plastic coupling device in accordance with the foregoing objects and wherein the elements are each rounded off in order to relieve of the necessity of providing a protecting shield around the coupling device.

Advantages of the improved coupling device comprising the subject matter of the present invention are numerous and among such advantages are the following:

(1) The plastic links of which the coupling device is composed can be readily formed to provide a smooth outer surface which will meet safety requirements without the use of a protective outer shield.

(2) Although no lubrication is necessary between the mating coupling elements and the sprocket teeth, the overall configuration of the coupling device is such as to readily hold lubricant within the coupling device which may be necessary for other purposes.

(3) The engagement of the plastic coupling elements with the sprocket teeth is quieter than is the case when metal coupling elements are utilized.

(4) Due to the natural resiliency of most plastics, it being contemplated that a plastic such as commercial "nylon" will be utilized, it is only necessary that straight pins be driven through the interleaved links in order to retain the coupling devices in assembly and this facilitates disassembly of the coupling device in the event it becomes necessary to disconnect the interconnected sprockets.

(5) The natural resilience of the plastic coupling elements permits reasonable misalignment of the two interconnected torque transmitting sprockets without undue heating or other undesirable effects.

(6) Due to the ease of disassembly of the coupling device, it is easier to remove either the driving or driven sprocket element when such becomes necessary for one reason or another.

(7) Inasmuch as each of the adjacent pairs of interconnected links are joined together by means of a simple pin, it is possible to take the coupling device apart at any point throughout its periphery. Such is not true in the case of conventional all metal couplings of this type utilizing substantially standard roller chain or silent chain links.

(8) Due to the resiliency of the plastic, there is a cushioning effect and the pin life of the connecting pins is improved. Further, this same resiliency contributes to the more uniform distribution of load throughout the entire coupling device.

(9) By using a plastic for forming the links of the coupling device, in the event of fire for some reason or another, such as would be the case if the elements got particularly hot, the plastic will melt at some predetermined temperature far lower than the melting point of the metal sprocket elements and this would immediately release the load on the driving sprocket which would be desirable.

The foregoing objects and advantages and numerous others will become apparent from the following detail description when read in conjunction with the accompanying drawings, wherein:

Fig. 1 is an elevational view, partly broken away, illustrating the coupling device comprising the subject matter of the present invention disposed in operative position around a pair of axially abutting sprocket members;

Fig. 2 is a sectional view taken substantially along the line 2—2 in Fig. 1 and looking in the direction of the arrows;

Fig. 3 is an enlarged perspective view of one of the plastic coupling elements of which the present coupling device is composed;

Fig. 4 is a sectional view of one of the coupling elements and is taken substantially along the line 4—4 in Fig. 3 and looking in the direction of the arrows; and Fig. 5 is a view of a slightly modified form of plastic coupling element than the form shown in Figs. 1–4.

With reference now to the drawings, wherein like reference numerals in the different views have been used to identify identical parts, the coupling device comprising the subject matter of the preferred embodiment of the present invention is designated generally by reference numeral 10 and is shown in Figs. 1 and 2 disposed around a pair of substantially axially abutting sprocket members 11 and 12. Each of the sprocket members 11 and 12 is provided with uniformly spaced peripheral teeth 13 and the coupling device 10 cooperates with said teeth in order to drivingly interconnect the sprockets 11 and 12 in torque transmitting relationship with each other.

The coupling device 10 comprises a plurality of links 14 which are preferably formed of a plastic such, for example, as nylon. Each of the links 14 comprises a plurality of peripherally extending plate portions 15, 16 and 17. The peripherally extending plate portions 15, 16 and 17 are cut away at one end, as indicated respectively at 15a, 16a and 17a for the purpose of receiving complementary substantially cylindrical rounded sprocket engaging portions 18 and 19. The plate portions are also cut away on their other ends as indicated at 15b, 16b and 17b and these cut away portions are designed to be interleaved with cut away portions 15a, 16a and 17a on the next adjacent links.

With the adjacent ends of the links interleaved with each other, the links are joined for pivotal movement with respect to each other by means of metal pins, preferably steel, designated by reference numeral 20. The pins 20 extend through openings 21 formed in one end of each of the plate portions 15, 16 and 17 and through openings 22 formed in the round sprocket engaging portions 18 and 19. Inasmuch as the coupling device 10 does not flex in operation, it is entirely satisfactory for the pins 20 to have a rather snug fit within openings 21 and 22 and, therefore, it is not necessary that the ends of the pins 20 be peened over or threaded or in any other way be provided with additional means for retaining the pins within the openings 21 and 22.

Each of the links 14 is provided with an outer shell portion 23 and the shell portions 23 on all the links form a substantially closed device when the links are assembled to form the coupling device 10. This facilitates keeping dirt out of the coupling device and away from the sprockets 11 and 12 and also serves to retain a lubricant within the coupling device whenever such is necessary, although when a plastic, such as nylon, is utilized, it is not essential that the portions 18 and 19 be lubricated. It will be noted also that each of the links 14 is rounded, as indicated at 24 at either end and this enables the coupling device 10 as a whole to present a smooth outer surface not readily adapted to engage or snag the sleeve of a person attending the structure or device utilizing one of the coupling devices as disclosed herein.

The links 14 are somewhat resilient and this, together with the fact that the links do not fit snugly between the sprocket teeth, permits some slight misalignment between the axes of rotation of the two sprockets 11 and 12. The magnitude of this misalignment, it will be understood, is of the order of a few degrees. The resiliency of the plastic links 14 also contributes to quietness of operation and enables the more uniform distribution of load throughout all of the links.

The embodiment of the invention disclosed in Fig. 5 is similar in all respects to the form shown in Figs. 1–4, with the single exception that the sprocket engaging portions 28 and 29 of each of the links 14a are barrel-shaped rather than substantially cylindrical. The barrel-shaped sprocket engaging portions 28 and 29 contribute to the greater flexibility of the coupling device and enables it to function properly with slightly greater degrees of angular misalignment of the axes of rotation of the sprockets 11 and 12.

It is contemplated that numerous changes and modifications may be made in the present invention without departing from the spirit or scope thereof.

What is claimed is:

1. A flexible coupling for interconnecting two approximately axially aligned shafts comprising a pair of toothed sprockets respectively adapted to be secured to the adjacent ends of said shafts, each of said sprockets being of substantially the same diameter and having the same number of uniformly spaced peripheral teeth, and a continuous flexible plastic chain wrapped around the sprockets and having the same number of interconnected links as there are teeth on each sprocket for respectively straddling the opposed teeth on the adjacent sprockets, each of the links of said chain comprising a molded member formed with peripherally extending plate portions having axially extending apertures respectively formed in each end thereof, one end of each plate portion being complementary to the other end of each plate portion, the opposite ends of the plate portions of each link being interleaved with respect to the complementary ends of the plate portions of each adjacent link, a plurality of metal pins respectively extending through the interleaved complementary ends of the plate portions for interconnecting the adjacent links and allowing relative flexing therebetween, and each of said links having its outer edges rounded off to eliminate the necessity of a protective cover guard for the coupling.

2. A flexible coupling for interconnecting two approximately axially aligned shafts comprising a pair of toothed sprockets respectively adapted to be secured to the adjacent ends of said shafts, each of said sprockets being of substantially the same diameter and having the same number of uniformly spaced peripheral teeth, and a continuous flexible plastic chain wrapped around the sprockets and having the same number of interconnected links as there are teeth on each sprocket for respectively straddling the opposed teeth on the adjacent sprockets, each of the links of said chain comprising a molded member formed with peripherally extending plate portions having axially extending apertures respectively formed in each end thereof, one end of each plate portion being complementary to the other end of each plate portion, the opposite ends of the plate portions of each link being interleaved with respect to the complementary ends of the plate portions of each adjacent link, a plurality of metal pins respectively extending through the interleaved complementary ends of the plate portions for interconnecting the adjacent links and allowing relative flexing therebetween, each of said links having a substantially cylindrically shaped outer surface whereby all of the interconnected links together form a substantially closed coupling tending to prevent the admission of dirt and other foreign elements into the coupling.

3. A flexible coupling for interconnecting two approximately axially aligned shafts comprising a pair of toothed sprockets respectively adapted to be secured to the adjacent ends of said shafts, each of said sprockets being of substantially the same diameter and having the same number of uniformly spaced peripheral teeth, and a continuous flexible plastic chain wrapped around the sprockets and having the same number of interconnected links as there are teeth on each sprocket for respectively straddling the opposed teeth on the adjacent sprockets, each of the links of said chain comprising a molded member formed with peripherally extending plate portions having axially extending apertures respectively formed in each end thereof, one end of each plate portion being complementary to the other end of each plate portion, the opposite ends of the plate portions of each link being interleaved with respect to the complementary ends of the plate portions of each adjacent link, a plurality of metal pins respectively extending through the interleaved complementary ends of the plate portions for interconnecting the adjacent links and allowing relative flexing therebetween, each of said links having a substantially cylindrically shaped outer surface whereby all of the interconnected links together form a substantially closed coupling tending to prevent the admission of dirt and other foreign elements into the coupling, and each of said links having its outer edges rounded off to eliminate the necessity of a protective cover guard for the coupling.

4. A flexible coupling for interconnecting two approximatley axially aligned shafts comprising a pair of toothed sprockets respectively adapted to be secured to the adjacent ends of said shafts, each of said sprockets being of substantially the same diameter and having the same number of uniformly spaced peripheral teeth, and a continuous flexible chain wrapped around the sprockets and having the same number of interconnected links as there are teeth on each sprocket for respectively straddling the opposed teeth on the adjacent sprockets, each of the links of said chain comprising a molded member formed with peripherally extending plate portions having axially extending apertures respectively formed in each end thereof, each link having rounded axially extending sprocket engaging portions disposed between the plate portions at one end of the plate portions with said apertures extending therethrough, one end of each plate portion being complementary to the other end of each plate portion, the opposite ends of the plate portions of each link being interleaved with respect to the complementary ends of the plate portions of each adjacent link, a plurality of metal pins respectively extending through the interleaved complementary ends of the plate portions and through said rounded sprocket engaging portions for interconnecting the adjacent links and allowing relative flexing therebetween, and each of said links having a substantially cylindrically shaped outer surface whereby all of the interconnected links together form a substantially closed coupling tending to prevent the admission of dirt and other foreign elements into the coupling.

5. A flexible coupling in accordance with claim 4 wherein the rounded sprocket engaging portions of each link are substantially cylindrically shaped.

6. A flexible coupling in accordance with claim 4 wherein the rounded sprocket engaging portions of each link are substantially barrel-shaped for enabling the coupling to accommodate greater axial misalignment between the interconnected shafts.

References Cited in the file of this patent

UNITED STATES PATENTS

| | | |
|---|---|---|
| 1,965,145 | Klaucke | July 3, 1934 |
| 2,079,460 | Marty | May 4, 1937 |
| 2,620,639 | Buraway | Dec. 9, 1952 |